(12) United States Patent
Brown

(10) Patent No.: US 7,009,006 B2
(45) Date of Patent: Mar. 7, 2006

(54) CROSSLINKABLE COMPOSITION

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 51 days.

(21) Appl. No.: 10/317,940

(22) Filed: Dec. 12, 2002

(65) Prior Publication Data

US 2003/0119954 A1    Jun. 26, 2003

Related U.S. Application Data

(60) Provisional application No. 60/340,457, filed on Dec. 13, 2001.

(51) Int. Cl.
*C08L 43/02* (2006.01)
*C08L 79/08* (2006.01)

(52) U.S. Cl. ............ 525/326.6; 525/50; 525/340; 525/376; 525/540

(58) Field of Classification Search ............ 525/326.6, 525/374, 50, 340, 540, 376

See application file for complete search history.

(56) References Cited

U.S. PATENT DOCUMENTS

| 4,487,964 A | 12/1984 | Watson, Jr. et al. ......... 564/252 |
| 5,047,588 A | 9/1991 | Taylor |
| 5,081,173 A | 1/1992 | Taylor ......................... 524/195 |
| 5,136,006 A | 8/1992 | Sundararaman et al. .... 526/312 |
| 5,258,481 A | 11/1993 | Hesselmans et al. .......... 528/28 |
| 5,373,080 A | 12/1994 | Imashiro et al. ............... 528/67 |
| 5,574,083 A | 11/1996 | Brown et al. ................ 524/186 |
| 5,936,043 A * | 8/1999 | Brown ..................... 525/328.5 |
| 6,194,522 B1 | 2/2001 | Brown ........................ 525/374 |
| 6,363,247 B1 | 3/2002 | Gum ........................... 455/404 |

FOREIGN PATENT DOCUMENTS

| EP | 0 259 511 A1 | 3/1988 |
| EP | 0 277 361 A1 | 8/1988 |
| EP | 0 241 805 B1 | 1/1991 |
| WO | WO 82/03167 | 9/1982 |

* cited by examiner

Primary Examiner—Kelechi C. Egwim
(74) Attorney, Agent, or Firm—Kim R. Jessum; Gary D. Greenblatt

(57) ABSTRACT

A crosslinkable composition is provided including copolymer particles having phosphorus acid groups dispersed in an aqueous medium, and polycarbodiimide, wherein the crosslinkable composition is substantially free of water soluble phosphorus acid compounds. Also provided is a process for forming the crosslinkable composition and a method for crosslinking the crosslinkable composition. The crosslinkable composition is useful as a coating composition to prepare coatings for various substrates including metal, wood, glass, paper, and leather.

5 Claims, No Drawings

CROSSLINKABLE COMPOSITION

CROSS REFERENCE TO RELATED PATENT APPLICATIONS

This is a non-provisional application of prior now abandoned U.S. provisional application Ser. No. 60/340,457 filed Dec. 13, 2001.

This invention relates to a crosslinkable composition containing copolymer particles having phosphorus acid groups dispersed in an aqueous medium and polycarbodiimide. The crosslinkable composition is substantially free of water soluble phosphorus acid compounds. The crosslinkable composition may be employed in various applications such as paints, lacquers, varnishes, sealants, nonwoven fabric binders, leather coatings, and adhesives.

Coating compositions containing film forming polymers bearing select functional groups and polycarbodiimide crosslinkers are known in the art. The polycarbodiimide crosslinkers react with the select functional groups attached to the film forming polymers, leading to coatings with certain improved protective properties such as increased hardness, solvent resistance, and mar resistance compared to noncrosslinked coatings.

U.S. Pat. No. 5,936,043 discloses crosslinkable compositions including an aliphatic polycarbodiimide and a polymer bearing at least two sulfur- or phosphorous-containing acid groups. The polymer contains as polymerized units, monomer having sulfur- or phosphorous-containing acid groups. The crosslinking reaction with the sulfur- or phosphorous-containing acid groups is slow enough that it substantially occurs during or after film formation with the result that coatings with improved protective properties such as mar resistance are obtained. However, despite this disclosure, coatings with increased levels of crosslinking are desired to provide coatings with increased protective properties.

The inventor has found a crosslinkable composition containing copolymer particles having phosphorus acid groups, polycarbodiimide, an aqueous medium, and being substantially free of water soluble phosphorus acid compounds. The crosslinkable composition allows the preparation of coatings with increased levels of crosslinking. The water soluble phosphorus acid compounds are found in compositions containing aqueous dispersions of copolymer particles prepared from phosphorus acid monomers. These water soluble phosphorus acid compounds are believed to result from impurities in the phosphorus acid monomers used to prepare the copolymer particles or are formed during the polymerization of the copolymer particles. In compositions containing significant levels of water soluble phosphorus acid compounds, the polycarbodiimide may react with both the phosphorus acid groups of the copolymer and the water soluble phosphorus acid compounds, thus reducing the extent of crosslinking between the copolymer particles. However, in a crosslinkable composition that is substantially free of water soluble phosphorus acid compounds, the carbodiimide reacts predominately with the phosphorus acid groups of the copolymer, leading to coatings with increased crosslink densities and improved hardness properties. Minimizing or eliminating reactions between the water soluble phosphorus acid compounds and the polycarbodiimide leads to more efficient use of the polycarbodiimide as a crosslinker for the polymer particles.

The crosslinkable composition of this invention is particularly useful for improving the performance properties of coatings and paints, formed therefrom. Alternatively, the invention offers the ability to formulate coatings and films of substantially equal performance properties as conventional polycarbodiimide crosslinkable formulations but with lower concentrations of expensive polycarbodiimide, with lower levels of expensive phosphorus acid monomer, or both.

In the first aspect of this invention, a crosslinkable composition is provided containing copolymer particles having first phosphorus acid groups; polycarbodiimide; an aqueous medium; and at least one water soluble phosphorus acid compound having at least one second phosphorus acid group, wherein the ratio of equivalents of the second phosphorus acid groups to equivalents of the first phosphorus acid groups is in the range of 0 to 2.

The second aspect of this invention provides a method is providing an article having a crosslinked polymer, including the steps of forming a crosslinkable composition containing a copolymer particles having first phosphorus acid groups, polycarbodiimide, an aqueous medium, and at least one water soluble phosphorus acid compound having at least one second phosphorus acid group, wherein the ratio of equivalents of the second phosphorus acid groups to equivalents of the first phosphorus acid groups is in the range of 0 to 2; applying the crosslinkable composition to a substrate; and curing or allowing to cure the crosslinkable composition.

In the third aspect of this invention, a process is provided for forming a crosslinkable composition including the steps of polymerizing at least one phosphorus acid monomer and at least one comonomer in an aqueous reaction medium to form copolymer particles having first phosphorus acid groups; and admixing polycarbodiimide with the copolymer particles; wherein the crosslinkable composition includes at least one water soluble phosphorus acid compound having at least one second phosphorus acid group and wherein the ratio of equivalents of the second phosphorus acid groups to equivalents of the first phosphorus acid groups is in the range of 0 to 2.

As used herein, the term "(meth)acrylate" refers to either acrylate or methacrylate and the term "(meth)acrylic" refers to either acrylic or methacrylic.

As used herein, the term "phosphorus acid group" refers to a phosphorus oxo acid having a POH moiety in which the hydrogen atom is ionizable. Also included in the term "phosphorus acid group" are salts of the phospho oxo acid. In its salt or basic form, the phosphorus acid group has a cation such as a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated based on the Fox equation.

The crosslinkable composition of this invention contains copolymer particles having phosphorus acid groups pendant to the polymer backbone. These phosphorus acid groups are referred to herein as "first phosphorus acid groups". The copolymer particles are formed from phosphorus acid monomer and are dispersed in an aqueous medium. The copolymer particles are insoluble in the aqueous medium. The crosslinkable composition is further characterized as being substantially-free of water soluble phosphorus acid compounds. The copolymer particles are addition polymers, which contain, as polymer units, at least one ethylenically unsaturated monomer having a phosphorus acid group, referred to herein as "phosphorus acid monomer" and at least one second ethylenically unsaturated monomer, referred to herein as "comonomer".

The phosphorus acid monomer contains at least one ethylenic unsaturation and a phosphorus acid group. The phosphorus acid monomer may be in the acid form or as a salt of the phosphorus acid groups. Examples of phosphorus acid monomers include:

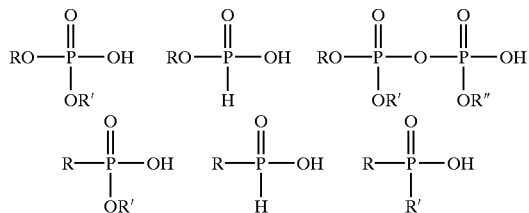

wherein R is an organic group containing an acryloxy, methacryloxy, or a vinyl group; and R' and R" are independently selected from H and a second organic group. The second organic group may be saturated or unsaturated. Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth) acrylates including 2-hydroxyethyl(meth)acrylate, 3-hydroxypropyl(meth)acrylates, and the like. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl(meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl(meth)acrylate, 2-phosphopropyl(meth)acrylate, 3-phosphopropyl(meth)acrylate, and 3-phospho-2-hydroxypropyl(meth)acrylate.

The comonomer is an ethylenically unsaturated monomer that is not a phosphorus acid monomer and is copolymerizable with an ethylenically unsaturated phosphorus acid monomer. Suitable comonomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth) acrylamide, various $C_1$–$C_{40}$ alkyl esters of (meth)acrylic acid; for example, methyl(meth)acrylate, ethyl(meth)acrylate, n-butyl(meth)acrylate, 2-ethylhexyl(meth)acrylate, cyclohexyl(meth)acrylate, n-octyl(meth)acrylate, n-decyl (meth)acrylate, n-dodecyl(meth)acrylate, tetradecyl(meth) acrylate, lauryl(meth)acrylate, oleyl(meth)acrylate, palmityl (meth)acrylate, and stearyl(meth)acrylate; other (meth) acrylates such as isobornyl(meth)acrylate, benzyl(meth) acrylate, phenyl(meth)acrylate, 2-bromoethyl(meth) acrylate, 2-phenylethyl(meth)acrylate, and 1-naphthyl (meth)acrylate, alkoxyalkyl(meth)acrylate, such as ethoxyethyl(meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; and carboxylic acid containing monomers such as (meth)acrylic acid, itaconic acid, fumaric acid, and maleic acid. The comonomer may also include at least one multiethylenically unsaturated monomer effective to raise the molecular weight and crosslink the polymer particle. Examples of multiethylenically unsaturated monomers that may be used include allyl (meth)acrylate, tripropylene glycol di(meth)acrylate, diethylene glycol di(meth)acrylate, ethylene glycol di(meth) acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The phosphorus acid monomer and comonomer, and the levels of these monomers may be chosen to provide the crosslinkable composition with desired properties for the intended application.

The copolymer particles may contain as polymerized units, phosphorus acid monomer at levels in the range of 0.1 to 20 weight %, preferably from 0.5 to 10 weight %, and more preferably from 1 to 6 weight %, based on the weight of the copolymer particles. The copolymer particles may contain as polymerized units, at least one comonomer at levels in the range of 80 to 99.9 weight %, preferably 90 to 99.5 weight %, and more preferably, from 94 to 99 weight %, based on the weight of the copolymer particles. In one embodiment, the copolymer does not contain carboxylic acid groups.

The copolymer particles according to the present invention may have a weight average molecular weight of at least 5,000, preferably at least 50,000, and more preferably, at least 100,000, as measured by gel permeation chromatography.

The $T_g$ of the copolymer particles may be in the range of –60° C. to greater than 120° C. Copolymer particles with $T_g$'s in the range of 0° C. to 80° C. may be employed as binders in coating compositions. Copolymer particles with $T_g$'s of 0° C. or less, in particular in the range of –60° C. to –10° C. are suitable in adhesive compositions.

The copolymer particles may have an average diameter in the range of 10 nm to 2 μm, preferably in the range of 20 nm to 1 μm, and more preferably in the range of 50 nm to 500 nm. The diameters of the copolymer particles may be characterized by distributions such as unimodal or multimodal including bimodal. The average diameter of the copolymer particles may be determined by a light scattering technique such as a quasielastic light scattering technique.

The polycarbodiimide contained in the crosslinkable composition may be an aliphatic polycarbodiimide, an aromatic polycarbodiimide, or a mixed polycarbodiimide. An aliphatic polycarbodiimide is a compound containing two or more aliphatic carbodiimide groups and does not contain an aromatic carbodiimide group. An aliphatic carbodiimide is defined herein as the grouping X—N=C=N—Y, wherein each of the groups X and Y are attached to the N-atom through an aliphatic C-atom. Examples of useful aliphatic polycarbodiimides include the commercial product Ucarlnk™ XL-29SE crosslinking compound (Union Carbide), the commercial product EX-5558 crosslinking compound (from Stahl Holland bv), as well as the compounds described in U.S. Pat. No. 5,081,173, U.S. Pat. No. 5,047,588, U.S. Pat. No. 5,136,006, U.S. Pat. No. 5,373,080, EP-0241805, U.S. Pat. No. 4,487,964, EP-0259511, EP-0274402, EP-0277361, and U.S. Pat. No. 5,258,481. An aromatic polycarbodiimide is a compound containing at least two aromatic carbodiimide groups and does not contain an aliphatic group. An aromatic carbodiimide is defined herein as the grouping X—N=C=N—Y, wherein either one or both of the groups X and Y are attached to the N-atom through an aromatic C-atom. Examples of aromatic polycarbodiimides are described in U.S. Pat. No. 5,574,083. A mixed polycarbodiimide is a compound containing at least one aliphatic carbodiimide group and at least one aromatic carbodiimide group. Preferred polycarbodiimides contain only aliphatic carbodiimide groups.

The ratio of equivalents of the sum of the first phosphorus acid groups and the second phosphorus acid groups to equivalents of carbodiimide groups may be in the range of 0.2 to 5, preferably in the range of 0.5 to 2.

The crosslinkable composition contains the copolymer particles dispersed in an aqueous medium. The aqueous medium may contain cosolvents including water miscible cosolvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits. The crosslinkable composition may be provided with 10 to 70 weight % copolymer particles, based on the weight of the crosslinkable composition.

The crosslinkable composition is characterized as being substantially free of water soluble phosphorus acid compounds. Water soluble phosphorus acid compounds contain phosphorus acid groups, referred to herein as "second phosphorus acid groups" and salts thereof. At a pH of 5 and above, the water soluble phosphorus acid compounds are contained as a solubilized component of the aqueous medium. The water soluble phosphorus acid compounds include inorganic phosphorus acid compounds and organic phosphorus acid compounds. Inorganic phosphorus acid compounds include phosphorus oxo acids such as phosphoric acid, phosphorous acid, hypophosphorous acid, orthophosphoric acid, pyrophosphoric acid, and salts thereof. Organic phosphorus acid compounds contain at least one phosphorus acid group attached to an organic moiety and include both unsaturated organic phosphorus acid compounds such as phosphorus acid monomers; and saturated organic phosphorus acid compounds such as partial esters of phosphorus oxo acids such as $HOCH_2CH_2OP(O)(OH)_2$, methyl phosphonic acid, and water soluble polymers bearing phosphorus acid groups. The water soluble polymer bearing phosphorus acid groups are addition polymers containing at least two phosphorus acid groups that are independently located pendant to the backbone of the water soluble polymer or in a terminal position. The water soluble polymer having phosphorus acid groups may be a homopolymer or a copolymer, and has a degree of polymerization of at least 2. As used herein, "saturated phosphorus acid compounds" are compounds selected from inorganic phosphorus acid compounds and saturated organic phosphorus acid compounds. Suitable salts of the water soluble phosphorus acid compounds include alkali metal salts such as sodium and potassium salts; alkaline metal salts such as magnesium salts; and ammonium salts. The level of water soluble phosphorus acid compounds in the crosslinkable composition is defined by ratios of equivalents of second phosphorus acid groups to equivalents of first phosphorus acid groups in the range of 0 to 2, preferably in the range of 0 to 1, and more preferably in the range of 0 to 0.75. The first phosphorus acid groups and the second phosphorus acid groups may be the same or may be different.

The ratio of equivalents of second phosphorus acid groups to equivalents of first phosphorus acid groups in the crosslinkable composition is determined by inductively coupled plasma spectroscopy detection of phosphorus atoms. First, the total level of phosphorus acid groups, which includes both the first phosphorus acid groups and the second phosphorus acid groups, is determined by inductively coupled plasma spectroscopy. Next, the pH of the crosslinkable composition is adjusted to a pH of at least 5 and the copolymer particles containing the first phosphorus acid groups are separated from the aqueous medium containing the water soluble phosphorus acid compounds. The level of second phosphorus acid groups in the aqueous medium is then determined by inductively coupled plasma spectroscopy. The equivalents of phosphorus acid groups in the copolymer particles are calculated by subtracting the level of second phosphorus acid groups in the aqueous medium from the total level of phosphorus acid groups.

Aqueous emulsion polymerization is suitable for preparing the copolymer particles as an aqueous polymer dispersion. The aqueous emulsion polymerization may be carried out by various procedures such as, for example, with all of the monomer in the reaction kettle at the beginning of the polymerization reaction, with a portion of the monomer in emulsified form present in the reaction kettle, and with a small particle size emulsion polymer seed preset in the reaction kettle at the beginning of the polymerization reaction. Aqueous emulsion polymerization of the phosphorus acid monomer to prepare the copolymer particles contained in the crosslinkable composition of this invention may be conducted in an aqueous reaction medium having a pH of less than or equal to 8, and preferably having a pH of less than or equal to 4. The polymerization process may be conducted as a batch, semicontinuous, or continuous process.

In one embodiment, the copolymer particles are prepared by an aqueous emulsion polymerization process in an aqueous reaction medium having a low pH. As used herein, a low pH is a pH of less than 2, preferably less than or equal to 1.8, and more preferably less than of equal to 1.5. The phosphorus acid monomer may be polymerized at a pH in the range of −1 to less than 2, preferably −1 to less than 1.8, and more preferably, −1 to 1.5. In another embodiment, the phosphorus acid monomer is polymerized at a pH in the range of 0 to 1.8, preferably in the range of 0 to 1.7, and more preferably in the range of 0 to 1.6. The pH of the aqueous reaction medium may be adjusted to a low pH by the addition of strong acids such as sulfuric acid; sulfurous acid; alkyl sulfonic acids such as methylsulfonic acid and alkyl ethylene oxide sulfonic acids; aryl sulfonic acids such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid. Preferred strong acids are strong acids that do not materially react with the polycarbodiimide at the levels of strong acid used to adjust the reaction medium to low pH. Examples of preferred strong acids are hydrochloric acid, perchloric acid, and nitric acid. The strong acid may be added to the aqueous reaction medium prior to the addition of the phosphorus acid monomer, or both before and during the addition of the phosphorus acid monomer. Alternatively, the strong acid may be added to the aqueous reaction medium after the addition of the phosphorus acid monomer but prior to the polymerization of the phosphorus acid monomer.

Although not wanting to be limited by theory, the inventors believe that in an aqueous reaction medium having a low pH, the phosphorus acid monomer is protonated and is less water soluble than at higher pH. Polymerization of the protonated phosphorus acid monomer leads to increased incorporation of the phosphorus acid monomer into the growing copolymer particles and a reduction in the formation of water soluble polymer bearing phosphorus acid groups in the aqueous reaction medium.

The pH of the aqueous reaction medium is determined using a pH meter equipped with electrodes such as silver chloride electrodes. The pH measurement may be conducted on the aqueous reaction medium in the reaction vessel or may be conducted on an aliquot of the aqueous reaction medium that has been removed from the reaction vessel. The pH measurement is made with the tested sample of the aqueous reaction medium at 20° C. The pH of the aqueous reaction medium is measured prior to, during, or after the polymerization of the phosphorus acid monomer. A pH measurement after the polymerization of the phosphorus acid monomer is made prior to the addition of substances that change the pH of the aqueous reaction medium.

Suitable emulsion polymerization processes including such processes as single and multiple shot batch processes. If desired, a monomer mixture containing the phosphorus acid monomer may be prepared and added gradually to the reaction vessel. The monomer composition within the reaction vessel may be varied during the course of the polymerization, such as by altering the composition of the monomers being fed into the reaction vessel. The monomer mixture may be pre-emulsified prior to addition to the aqueous reaction medium. Surfactant may be used to aid in the pre-emulsification of the monomer mixture. The monomer mixture may also contain water, solvents, defoamers, and strong acids. The aqueous reaction medium may also include water miscible solvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits.

Temperatures suitable for the preparation of the copolymer particles by an aqueous emulsion polymerization process are in the range of 20° C. to less than 100° C., preferably in the range of 40° C. to 95° C., and more preferably in the range of 50° C. to 90° C. The reaction vessel, containing an initial quantity of water and optionally other synthesis adjuvants such as surfactants or acid, may be preheated to a determined temperature prior to the addition of the monomer mixture. Typically, the aqueous reaction medium is agitated to promote mixing. The headspace of the reaction vessel may be flushed with nitrogen or another inert gas to minimize the level of oxygen in the reaction vessel. Single or multiple stage polymerization techniques may be used.

A polymerization initiator may be added to the reaction medium to initiate polymerization of the ethylenically unsaturated monomers. The polymerization initiator may be added prior to or after the addition of the monomer mixture, or cofed with the monomer mixture. Examples of polymerization initiators that may be employed include polymerization initiators that thermally decompose at the polymerization temperature to generate free radicals. Examples include both water-soluble and water-insoluble species. Examples of free radical-generating initiators which may be used include persulfates, such as ammonium or alkali metal (potassium, sodium, or lithium) persulfate; azo compounds such as 2,2'-azobis(isobutyronitrile), 2,2'-azobis(2,4-dimethylvaleronitrile), and t-butyl azocyanocyclohexane; hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators may be used alone or as the oxidizing component of a redox system, which also includes a reducing component such as ascorbic acid, malic acid, glycolic acid, oxalic acid, lactic acid, thioglycolic acid, or an alkali metal sulfite, more specifically a hydrosulfite, hyposulfite, or metabisulfite, such as sodium hydrosulfite, potassium hyposulfite, and potassium metabisulfite, or sodium formaldehyde sulfoxylate.

The initiator and the optional reducing component may be used in proportions from 0.001% to 5% each, based on the weight of the monomers in the monomer mixture to be polymerized. Accelerators such as chloride and sulfate salts of cobalt, iron, nickel, or copper may be used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents may be added to the aqueous reaction medium to control the molecular weight of the copolymer particles, if desired. Examples of chain transfer agents include mercaptans, polymercaptans, and polyhalogen compounds. Examples of chain transfer agents which may be used include alkyl mercaptans such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols such as isopropanol, isobutanol, lauryl alcohol, and t-octyl alcohol; halogenated compounds such as carbon tetrachloride, tetrachloroethylene, and trichlorobromoethane. Generally from 0 to 10% by weight, based on the weight of the monomers in the monomer mixture used to prepare the copolymer particles, may be used. The polymer molecular weight may be controlled by other techniques known in the art, such as selecting the ratio of the initiator to total monomer amount.

Catalyst and/or chain transfer agent may be dissolved or dispersed in separate or the same fluid medium and gradually added to the polymerization vessel. Monomer, either neat or dissolved or dispersed in a fluid medium, may be added simultaneously with the catalyst and/or the chain transfer agent. Amounts of initiator or catalyst may be added to the reaction medium to "chase" residual monomer after polymerization has been substantially completed to polymerize the residual monomer as is well known in the polymerization arts.

In the preparation of the copolymer particles by aqueous emulsion polymerization, the aqueous reaction medium may contain surfactant to stabilize the growing copolymer particles during polymerization and to discourage aggregation of the copolymer particles in the resulting aqueous polymer dispersion. One or more surfactants such as anionic or nonionic surfactant, or a mixture thereof, may be used. Many examples of surfactant suitable for emulsion polymerization are given in *McCutcheon's Detergents and Emulsifiers* (MC Publishing Co. Glen Rock, NF), published annually. Other types of stabilizing agents such as protective colloids, may also be used. However, it is preferred that the amount and type of stabilizing surfactant or other type of stabilizing agent employed during the polymerization reaction be selected so that residual stabilizing agent in the resulting aqueous polymer dispersion does not significantly interfere with the properties of the aqueous polymer dispersion, the properties of compositions including the aqueous polymer dispersion, or articles prepared from the aqueous polymer dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units such as, for example, heptyl phenoxypolyethoxyethanols; ethylene oxide derivatives of long chained carboxylic acids such as lauric acid, myristic acid, palmitic acid, oleic acid, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyvinyl alcohol may be used.

The crosslinkable composition of this invention may be prepared by various processes including processes that remove the water soluble phosphorus acid compounds from a composition containing the copolymer particles, processes that prepare the copolymer particles in an aqueous reaction medium substantially free of inorganic phosphorus acid compounds and saturated organic phosphorus acid compounds, processes that prepare the copolymer particles without the concomitant formation of the water soluble phosphorus acid compound, or a combination of these processes.

The water soluble phosphorus acid compounds may be removed from an aqueous composition containing the copolymer particles dispersed in an aqueous medium by first adjusting the pH of the aqueous medium to a value of 3 or greater. Next, the insoluble copolymer particles and the aqueous medium are separated by a suitable technique, such as filtration or centrifugation. Then, the copolymer particles are redispersed into water. This process may be repeated one or more times to provide the crosslinkable composition of this invention. Alternately, the water soluble phosphorus acid compound may be removed from the aqueous medium by diafiltration. Another method to remove the water soluble phosphorus acid compounds is treatment of the aqueous composition with a suitable ion exchange resin.

The copolymer particles contained in the crosslinkable composition of this invention may be prepared by polymerization of an aqueous reaction medium that is substantially free of saturated phosphorus acid compounds. In this process, an aqueous reaction medium is prepared containing at least one phosphorus acid monomer, at least one comonomer, and having a level of saturated phosphorus acid compounds defined by a ratio of equivalents of second phosphorus acid groups for the inorganic phosphorus acid compounds and saturated organic phosphorus acid compounds to equivalents of phosphorus groups for the phosphorus acid monomer in the range of 0 to 0.2, preferably in the range of 0 to 0.1, and more preferably in the range of 0 to 0.05. Next, the reaction medium is polymerized to provide the copolymer particles. In one embodiment of this polymerization process, the phosphorus acid monomer is treated prior to polymerization to remove impurities such as saturated phosphorus acid compound. These impurities may be separated from the phosphorus acid monomer by techniques such as solvent extraction. The treated phosphorus acid monomer may be provided as a purified monomer composition containing at least one phosphorus acid monomer and having a level of saturated phosphorus acid compounds defined by a ratio of equivalents of phosphorus acid groups of the saturated phosphorus acid compound to equivalents of phosphorus acid groups of the phosphorus acid monomer in the range of 0 to 0.2, preferably in the range of 0 to 0.1, and more preferably in the range of 0 to 0.05.

The copolymer particles may also be prepared by processes that minimize the formation of water soluble phosphorus acid compounds such as a low pH aqueous polymerization process that prepares the copolymer particles while minimizing formation of water soluble polymer having phosphorus acid groups. In one embodiment, the copolymer particles are prepared by polymerization of purified phosphorus acid monomer using a low pH aqueous polymerization process.

The crosslinkable composition may be formed by admixing an aqueous dispersion containing the copolymer particles and that is substantially free of water soluble phosphorus acid compounds, and the polycarbodiimide using conventional mixing techniques including mechanical agitation such as stirring using a motor-driven stirring blade.

The crosslinkable composition may be free of organic solvent or it may contain a coalescing solvent. The crosslinkable composition may contain typical coating additives such as binder, fillers, defoamers, other cross-linkers, catalysts, surfactants, stabilizers, anti-flocculants, aqueous or non-aqueous solutions or dispersions or non-reactive polymer (by "non-reactive polymer" herein is meant polymer substantially free from carbodiimide or acid functionality), tackifiers, coalescents, colorants, waxes, antioxidants, pigments, and suitable solvents, such as water miscible solvents.

The crosslinkable composition of this invention may be applied by methods well known in the art such as air-assisted spray, airless spray, plural component spray, brush, roller squeegee, roll coater, curtain coater, and the like. Substrates to which the crosslinkable composition of this invention may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and nonwoven material such as cloth, wool, synthetic and natural fiber, and textiles. The crosslinkable composition may be used, for example, as a wood coating, maintenance coating, interior or exterior wall coating, metal primer or coating, plastic coating, traffic paint, woven or nonwoven textile saturant or coating, leather coating, coil coating, architectural coating, mastic, sealant, caulk, board coating, paper coating, plastics coating, ink, overcoat varnish, flooring coating, and adhesive. Coatings prepared from the crosslinkable composition may be clear coatings, flat coatings, satin coatings, semi-gloss coatings, gloss coatings, primer, textured coatings, and the like.

After the crosslinkable composition is applied to a substrate, the crosslinkable composition may be dried or allowed to dry to form a film. Heat may be applied to dry the crosslinkable composition. Curing, that is, reaction between the carbodiimide functionality and the phosphorus acid group is believed to occur materially during the drying step or after formation of a film. The drying and the curing may occur simultaneously or as separate steps. Curing to yield useful properties may take place at a convenient rate at ambient temperatures such as, for example, form 0° C. to 35° C. However, it is sometimes desirable to accelerate the rate of property development by heating the applied crosslinkable composition to a temperature from 25° C. to 200° C. Preferred is a curing temperature from 25° C. to 60° C.

EXAMPLE 1

Purification of Phosphoethyl Methacrylate

A sample of unpurified phosphoethyl methacrylate containing 20 weight % free phosphoric acid was purified by first adding 350 g of a saturated aqueous sodium chloride solution (5.3 M NaCl), 200 g unpurified phosphoethyl methacrylate, and 270 g butyl acetate to a 1 liter separatory funnel. The mixture was shaken for 1 to 2 minutes and then allowed to separate into two phases. The lower aqueous phase was drained from the separatory funnel. The organic top phase was then transferred to a container. Next, 10 g magnesium sulfate was added to the organic phase and the organic phase was mixed for 10 minutes. The organic phase was then filtered to remove the magnesium sulfate. The butyl acetate was removed from the organic phase on a Buchii Rota-Evaporator to yield purified phosphoethyl methacrylate containing 1 weight % free phosphoric acid.

The following abbreviations were used in the examples: surfactant-A surfactant having an average composition of lauryl-(ethylene oxide)$_4$ sodium sulfate; 30 wt % solids

| ME-1 | first monomer emulsion |
| ME-2 | second monomer emulsion |
| PEM | phosphoethyl methacrylate |
| g | grams |

The ammonium hydroxide was at 28% active.

EXAMPLE 2

Preparation of Aqueous Dispersion Containing the Copolymer Particles

To the flask was added 800 g deionized water and 3.0 g concentrated hydrochloric acid and heated to 85° C. under a nitrogen atmosphere. A mixture of 3.0 g surfactant-A having in 10 g deionized water was added to the flask followed by the addition of ME-1 prepared by mixing 12 g deionized water, 1.0 g of surfactant-A, 8.0 g butyl acrylate, and 28.0 g methyl methacrylate. Following the addition of the ME-1, a mixture of 2.4 g sodium persulfate in 20 g deionized water was added to the flask and the contents of the flask were held for a period of 10 minutes to polymerization the added monomer. After the 10 minute hold, ME-2 containing 160 g deionized water, 16.0 g surfactant-A, 124.0 g butyl acrylate, 422.0 g methyl methacrylate, and 18.0 g purified phosphoethyl methacrylate was added to the flask at a rate of 7.5 g/minute at 85° C. The pH of the reaction medium prior to and after the addition of the PEM was 0.8. After the complete addition of ME-2, the contents of the flask were maintained at 85° C. for 15 minutes and then cooled to room temperature. Next, 16 g ammonium hydroxide was added and the contents of the flask were filtered to remove any coagulum. The dispersion containing the copolymer particles had a solids content of 35.3 weight %, an average particle diameter of 128 nm, and a pH of 9.0. The ratio of second phosphorus acid groups to first phosphorus acid groups in Example 2 was estimated to be 0.6.

COMPARATIVE A

Preparation of Comparative Aqueous Dispersion Containing the Copolymer Particles A comparative crosslinkable composition was prepared according to the procedure of Example 2 except that the PEM was unpurified and hydrochloric acid was not included in the process. The pH's of the reaction medium prior to and after the addition of the PEM were 7.5 and 2.2.

The comparative aqueous dispersion containing the copolymer particles had a solids content of 35.7 weight %, an average particle diameter of 115 nm, and a pH of 8.7. The ratio of second phosphorus acid groups to first phosphorus acid groups in Comparative A was estimated to be 4.

EXAMPLE 3

Preparation of Crosslinkable Composition

The crosslinkable composition of this invention and a comparable crosslinkable composition were prepared by combining the ingredients in the order listed in Table 3.1

TABLE 3.1

Crosslinkable Composition and Comparative Crosslinkable Composition

|  | Example 3 | Comparative B |
|---|---|---|
| Example 2 | 50.0 g | |
| Comparative A | | 50.0 g |
| butyl carbitol | 5.30 g | 5.35 g |
| Colloid ™ 643 defoamer (Allied Colloids Limited Company) | 0.20 g | 0.20 g |
| Acrysol ™ RM-2020 rheology modifier Rohm and Haas Company) | 4.00 g | 4.00 g |
| UCARLNK ™ XL-29SE polycarbodiimide (Union Carbide Co.) | 3.05 g | 3.08 g |

Coated samples were prepared by casting the crosslinkable composition and the comparative crosslinkable composition onto Teflon™ coated glass plates using a 254 μm (10 mil) gap blade and drying for 6 days at 20% relative humidity and 20° C.

The crosslink density of the coatings was characterized using the methyl ethyl ketone (MEK) swell test. In this test, a 1.28 cm×1.28 cm square of the coating was cut and removed from the plates, and immersed in MEK overnight. The MEK swell ratio was determined by measuring the length of one side of the square in centimeters using a micrometer, and calculating the swell ratio according to the following equation:

$$\text{swell ratio} = (\text{length of square}/1.28)^3$$

A smaller swell ratio indicates a higher degree of crosslinking.

TABLE 3.2

Swell Ratios for Coatings

|  | Example 3 | Comparative B |
|---|---|---|
| MEK swell ratio | 6.55 | 9.60 |

The results in Table 3.2 show that the coating prepared from, Example 3, the crosslinkable composition of this invention has a lower swell ratio than a comparative coating prepared from Comparative B, a comparative crosslinkable composition. The lower value for the swell ratio indicated that the crosslinkable composition of this invention, which was substantially free of water soluble phosphorus acid compounds, provided coatings with higher crosslink densities than coatings prepared from comparative B, which was not substantially free of water soluble phosphorus acid compounds.

I claim:
1. A crosslinkable composition comprising:
   a) copolymer particles having first phosphorus acid groups;
   b) polycarbodiimide;
   c) an aqueous medium; and
   d) at least one water soluble phosphorus acid compound having at least one second phosphorus acid group; wherein the ratio of equivalents of said second phosphorus acid groups to equivalents of said first phosphorus acid groups is between greater than 0 and 2.

2. The crosslinkable composition according to claim 1 wherein said ratio of equivalents of said second phosphorus acid groups to equivalents of said first phosphorus acid groups between greater than 0 and 1.

3. The crosslinkable composition according to claim 1 wherein said ratio of equivalents of said second phosphorus acid groups to equivalents of said first phosphorus acid groups is between greater than 0 and 0.75.

4. The crosslinkable composition according to claim 1 wherein said copolymer particles comprise as polymerized units:
   a) 0.1 to 20 weight % of at least one phosphorus acid monomer; and
   b) 80 to 99.9 weight % of at least one comonomer; based on the weight of the copolymer particles.

5. The crosslinkable composition according to claim 1 wherein said copolymer particles are prepared by polymerization of said at least one phosphorus acid monomer in an aqueous reaction medium having a pH of less than 2.

* * * * *